United States Patent [19]
Mitani et al.

[11] Patent Number: 5,586,469
[45] Date of Patent: Dec. 24, 1996

[54] OUT-OF-CIRCUIT BALL PREVENTING STRUCTURE FOR BALL SCREW NUT

[75] Inventors: Hidenaga Mitani; Hiroshi Morimoto, both of Gunma, Japan

[73] Assignee: NSK Ltd., Tokyo, Japan

[21] Appl. No.: 404,443

[22] Filed: Mar. 15, 1995

[30] Foreign Application Priority Data

Mar. 15, 1994 [JP] Japan ................................. 6-044306

[51] Int. Cl.⁶ .................................................. F16H 25/22
[52] U.S. Cl. ........................... 74/459; 74/424.8 R
[58] Field of Search .......................... 74/424.8 R, 459

[56] References Cited

U.S. PATENT DOCUMENTS

| 3,176,535 | 4/1965 | Rowland | 74/459 |
| 3,661,030 | 5/1972 | Gagne | 74/459 |

FOREIGN PATENT DOCUMENTS

| 0444352A1 | 9/1991 | European Pat. Off. . |
| 4039573A1 | 6/1992 | Germany . |

OTHER PUBLICATIONS

Spur, Gunter, Stoferle, Theodor: "Handbuch der Fertigungstechnik", vol. 3/2 (Spanen), Carl Hauser Verlag, Munchen, Wien, 1980, ISBN 3-446-12648-1, pp. 547-551.

Primary Examiner—Allan D. Herrmann
Attorney, Agent, or Firm—Sughrue, Mion, Zinn, Macpeak & Seas

[57] ABSTRACT

In an out-of-circuit ball preventing structure for a ball screw nut having a plurality of ball circulation circuits over an inner circumferential surface thereof, an oblique diameter of an out-of-circuit groove is made smaller than an oblique diameter of an in-circuit groove.

1 Claim, 5 Drawing Sheets

OUT-OF-CIRCUIT BALL PREVENTING STRUCTURE FOR BALL SCREW NUT

BACKGROUND OF THE INVENTION

The present invention relates to an improved out-of-circuit ball preventing structure for ball screw nuts of the ball circulation tube type and of the ball circulation piece type.

A ball screw apparatus has a ball circulation passage for circulating balls therein. Structures of the ball circulation passage are known in that a ball circulation tube or a ball circulation piece is provided in the barrel portion of the ball screw nut and that ball circulation curved passages are arranged on both front and rear ends of the ball screw nut. Each nut has one or more circulation passages (hereinafter, refer as circuits) using the ball circulation tube or ball circulation piece. In the case where the nut has a plurality of circuits, a groove portion through which no balls circulate, i.e., through which no balls pass (hereinafter, refer as an out-of-circuit groove) is present between one circuit and other circuit(s) adjacent thereto.

For example, FIGS. 5 to 7 show a ball screw nut of ball circulation tube type, in which an out-of-circuit groove Sout is present between a first circuit S1 and a second circuit S2.

To assemble such a ball screw nut 2 of the ball circulation tube type, a screw shaft 1 is inserted into the ball screw nut 2 without circulation tubes 3; balls B are sequentially introduced from ball circulation holes 4 in the barrel portion of the nut to load the balls B into ball passages formed by screw grooves 2a over the inner circumferential surface of the ball screw nut 2 and screw grooves 1a confronting the screw grooves 2a over the outer circumferential surface of the screw shaft 1. Once the balls B have been loaded up to the ball circulation holes 4, both leg portions of each U-shaped circulation tube 3 with balls B loaded separately in advance are inserted into the ball circulation holes 4, and the ball circulation holes 4 are then fixed to the barrel portion of the nut with fasteners to complete the assembling.

In the case where there are two ball circulation circuits, no balls are normally present in the out-of-circuit groove Sout between the screw groove S1in of the first circuit S1 (in-circuit groove) and the screw groove S2in of the second circuit S2. However, if some balls are erroneously introduced into the out-of-circuit groove during the ball loading operation, tongue portions 3a at both ends of the circulation tube 3 are damaged, thereby making it likely that the function of the ball screw will be impaired.

A deflector 5 such as shown in FIG. 8 has heretofore been employed as a structure for preventing erroneous insertion of a ball into such out-of-circuit groove Sout (out-of-circuit ball Bout). The deflector 5 is attached to the out-of-circuit groove Sout of the ball screw nut 2 as shown in FIGS. 9 and 10.

However, the conventional out-of-circuit ball preventing structure for a ball screw nut is not only cumbersome in terms of having to specially make and attach the complicatedly shaped iron deflector 5 but also costly in terms of material, the number of machining and assembling steps, as well as the number of parts.

SUMMARY OF THE INVENTION

The present invention has been made in view of the conventional problems. Accordingly, the object of the present invention is to provide an out-of-circuit ball preventing structure for a ball screw nut which can completely prevent out-of-circuit balls without using a deflector.

To overcome the above object, the present invention is applied to an out-of-circuit ball preventing structure for a ball screw nut having a plurality of ball circulation circuits over an inner circumferential surface thereof, in which an oblique diameter of an out-of-circuit groove is made smaller than an oblique diameter of an in-circuit groove.

According to the present invention, if an out-of-circuit ball is erroneously introduced into the out-of-circuit groove of the ball screw nut, the passage of the out-of-circuit groove is so narrow that the ball screw nut 2 is locked. As a result, the screw shaft and the ball screw nut cannot be rotated relative to each other, thereby locating the out-of-circuit ball with ease.

DETAILED DESCRIPTION OF THE PREFERRED EMBODIMENTS

Embodiments of the present invention will now be described with reference to the drawings.

Figure 1:
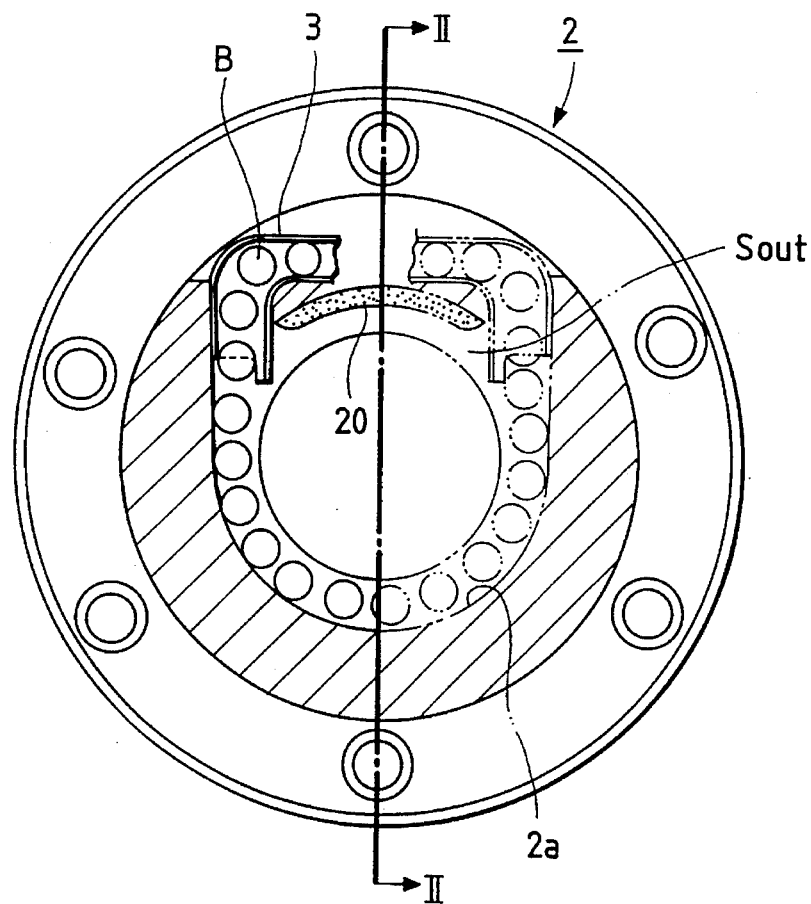
FIG. 1 is a sectional view showing a main portion of an embodiment of the present invention.
Figure 2:
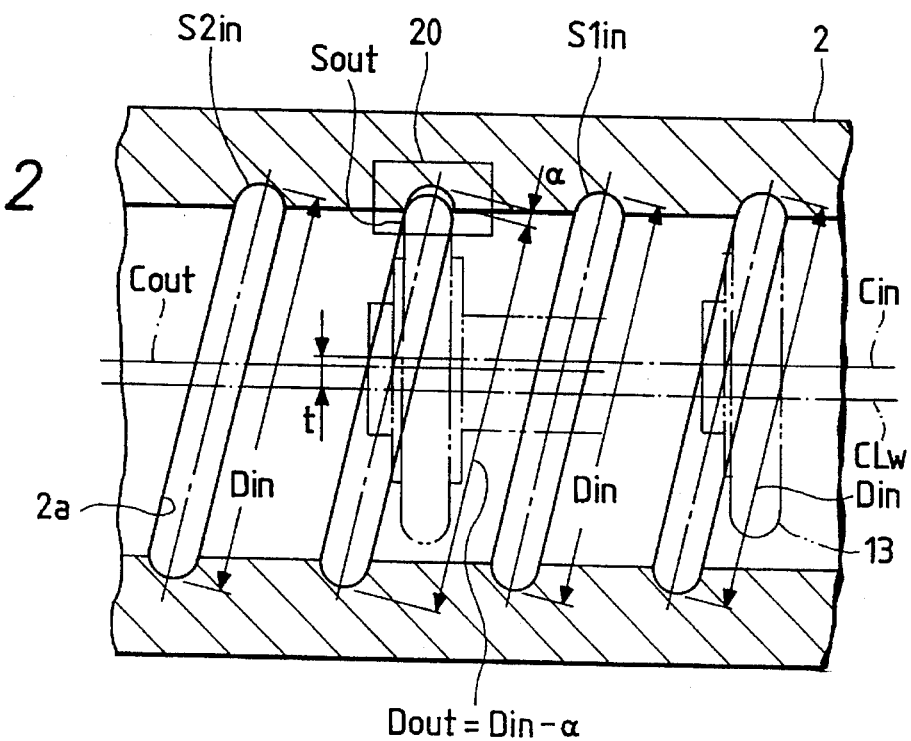
FIG. 2 is an upper sectional view showing the main portion taken along a line II—II in FIG. 1.
Figure 10:
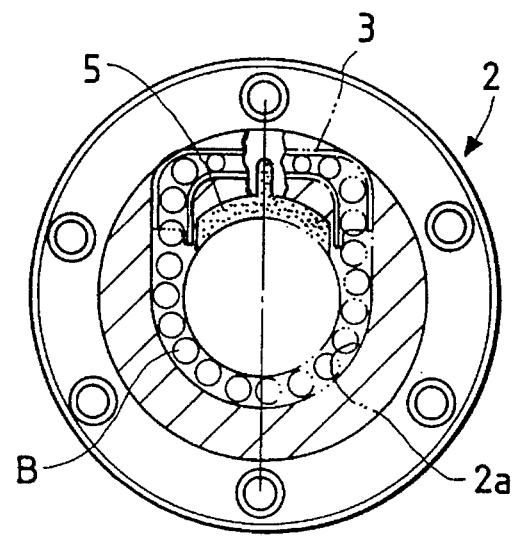
FIG. 10 is a sectional view of the ball screw nut taken along a line X—X in FIG. 9.

FIG. 1 is a sectional view showing an embodiment of the present invention corresponding to FIG. 10; and FIG. 2 is a sectional view showing a main portion taken along a line II—II in FIG. 1 (a circulation tube is omitted). It may be noted that the parts and components which are the same as or equivalent to the conventional example are denoted by the same reference characters.

A ball screw nut according to this embodiment is characterized in that an oblique diameter Dout of an out-of-circuit groove Sout between a first in-circuit groove S1in and a second in-circuit groove S2in is made smaller than an oblique diameter Din of each of the in-circuit grooves S1in, S2in. That is, it is represented with the following equation:

$$Dout = Din - \alpha$$

The aforementioned oblique diameters (Dout, Din, and the like) provide the maximum values (within a single pitch) calculated when a steel ball (gauge) of a measuring apparatus (not shown) is moved along a screw groove 2a of the ball screw nut 2.

Figure 3:
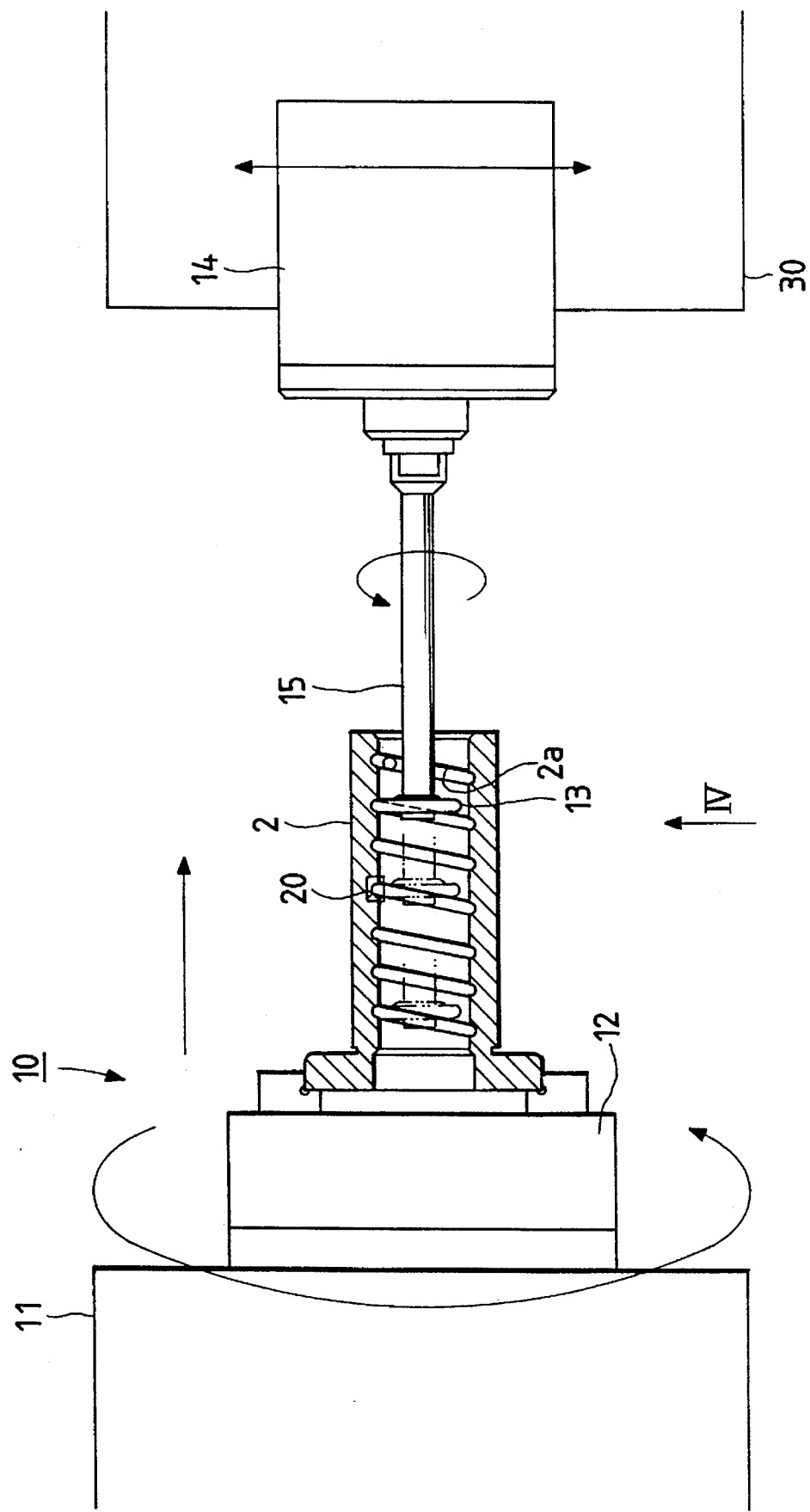
FIG. 3 is an upper diagram illustrative of a machining method for embodying the present invention.

A method of machining such an out-of-circuit groove Sout will be described with reference to FIGS. 3 and 4.

This machining operation is performed during the process of grinding the nut screw grooves 2a in the ball screw nut 2 manufacturing process.

That is, a ball screw nut 2, which is a workpiece to be machined, is mounted on a chuck 12 of a main shaft 11 of a grinding machine 10 directly or through a mounting jig. A grinding wheel 13 formed in accordance with the shape and dimensions of the screw groove 2a of the nut is attached to a high frequency spindle 14 through a quill 15, and the grinding wheel 13 is then inserted into the ball screw nut 2 to grind the screw grooves 2a of the nut by forwardly feeding the ball screw nut 2 at a predetermined lead. In performing this operation, an offset mechanism 30 mounting the high frequency spindle 14 releases the grinding wheel 13 only while an out-of-circuit range 20 is being ground so that the oblique diameter Dout of the out-of-circuit groove Sout can be made smaller.

Specifically, as shown in FIG. 2, a centerline Cout of the grinding wheel for the out-of-circuit range 20 is shifted only by t inwardly with respect to a centerline Cin of the grinding wheel, the centerline Cin being the centerline for grinding the in-circuit grooves S1in and S2in that are eccentric toward the grinding side from a centerline CLw of the ball screw nut 2 which is the workpiece. As a result of this operation, the relationship between Dout and Din satisfies the aforementioned equation Dout=Din−α.

Phase matching of the offset machining of the out-of-circuit groove Sout is effected as follows.

Figure 4:
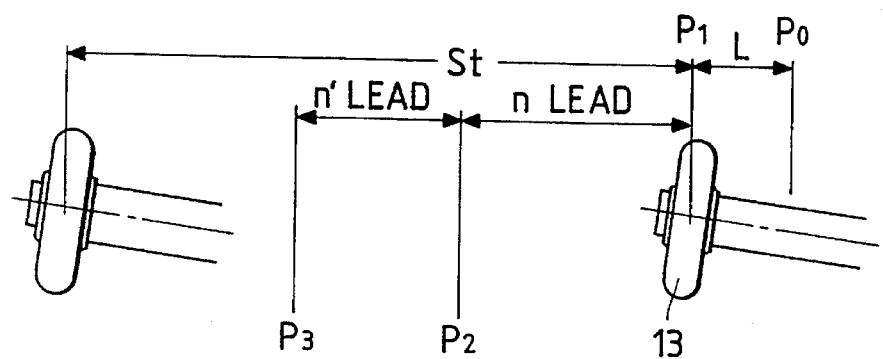
FIG. 4 is a diagram illustrative of the movement of a grinding wheel relative to a ball screw nut viewed from an arrow IV in FIG. 3.
Figure 5:
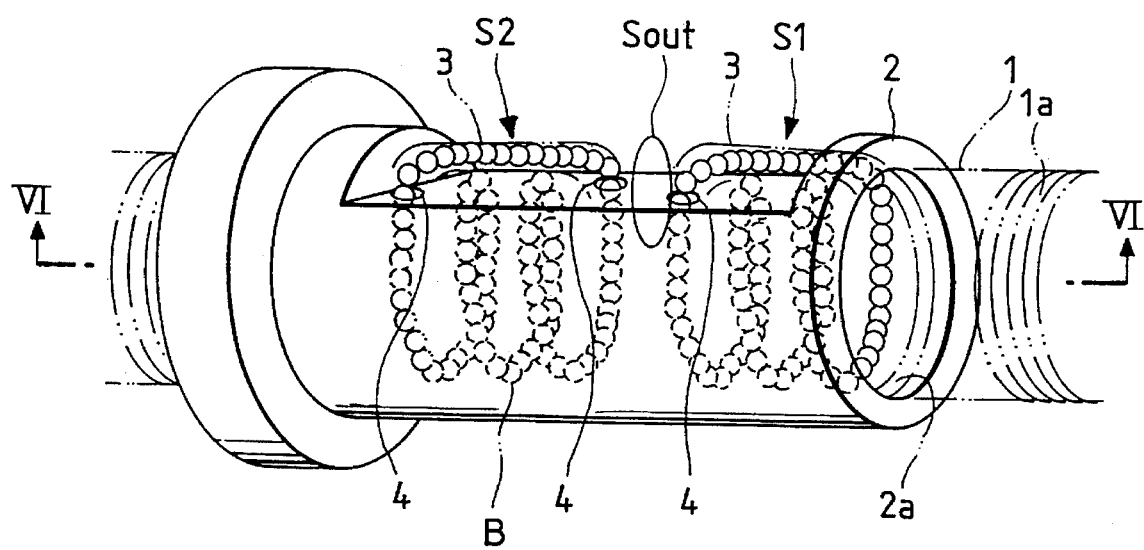
FIG. 5 is a schematic diagram illustrative of ball circulation passages of a ball screw nut having two circuits to which the present invention is applied.
Figure 6:
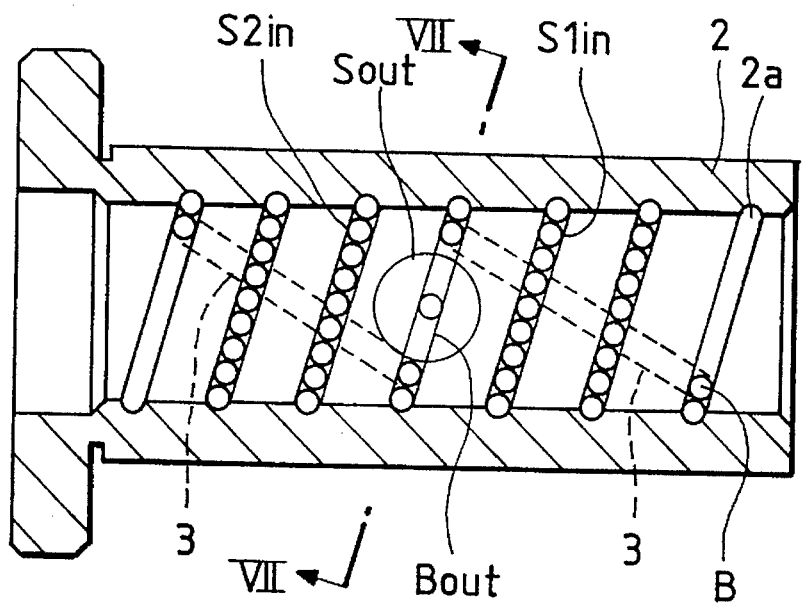
FIG. 6 is a sectional view of the ball screw nut taken along a line VI—VI in FIG. 5.
Figure 7:
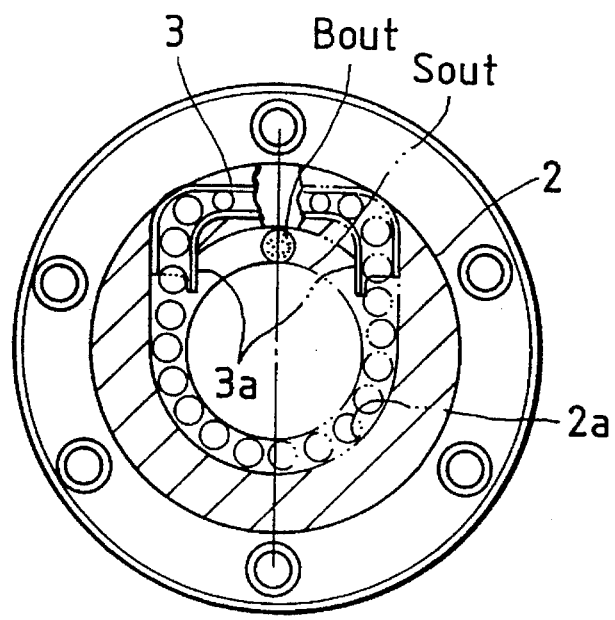
FIG. 7 is a sectional view of the ball screw nut taken along a line VII—VII in FIG. 6.
Figure 8:
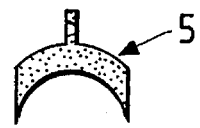
FIG. 8 is a front view of a conventional deflator.
Figure 9:
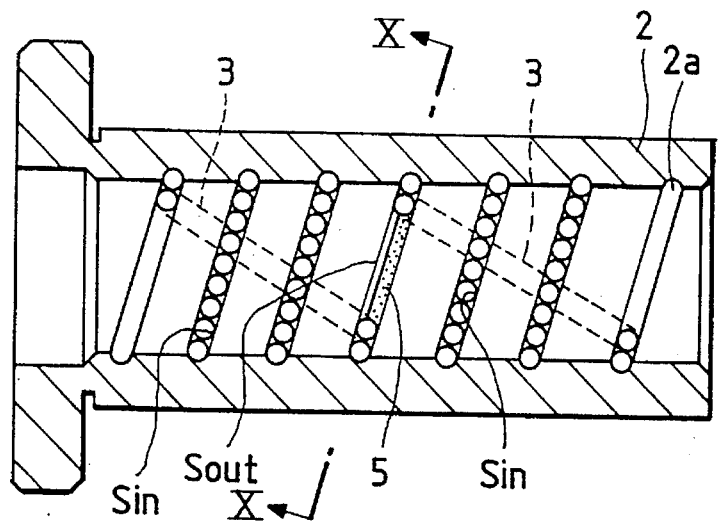
FIG. 9 is a sectional view showing a conventional out-of-circuit ball preventing structure using the deflector.

In FIG. 4, $P_0$ is the fixed position (machining origin); $P_1$ is the approach position; $P_2$ is the first out-of-circuit offset position; $P_3$ is the next out-of-circuit offset position (that is, in the case where there are three circuits or more); L is the approach distance; and St is the stroke of the grinding wheel 13 relatively moving from the approach position $P_1$ in accordance with the feeding movement of the ball screw nut 2. That is, $P_1$, $P_2$, and $P_3$ indicate relative positions where the grinding wheel 13 reaches by feeding the ball screw nut 2.

First, the ball screw nut 2 is fed only by the approach distance L so that the grinding wheel 13 reaches the approach position $P_1$ from the fixed position $P_0$; and then, once the grinding wheel 13 has reached the approach position $P_1$ until the grinding wheel 13 reaches an nth lead, the first in-circuit groove Sin is ground with the centerline of the grinding wheel 13 being aligned with the centerline Cin of the grinding wheel for grinding the in-circuit groove.

When the grinding wheel has reached the first out-of-circuit offset position $P_2$ at the nth lead by feeding the ball screw nut 2, the grinding wheel 13 is set off only by t (e.g., 150 μm), so that the oblique diameter Dout is made smaller than the oblique diameter Din by α (152 μm in this case) by making the centerline of the grinding wheel 13 coincident with the centerline Cout of the grinding wheel for grinding the out-of-circuit groove in the out-of-circuit range 20 (within the range ±β° in rotation angle of the workpiece regarding the nth lead as a reference, with β being equal to, e.g., 9°). The phase setting of the out-of-circuit offset position $P_2$ at the nth lead is made by adjusting (e.g., by inputting macro variables in Numerical Control) the approach distance L in accordance with the parameters of the workpiece to be machined (the ball screw nut 2).

At a next n'th lead, the next in-circuit groove Sin is ground by aligning the centerline of the grinding wheel 13 with the centerline Cin of the grinding wheel for grinding the in-circuit groove. At the out-of-circuit offset position $P_3$ at the n'th lead, the grinding wheel 13 is held by making the centerline of the grinding wheel 13 coincident with the centerline Cout of the grinding wheel for grinding the out-of-circuit groove within the range ±β° in rotation angle of the workpiece again.

The aforementioned respective preset values n, n', β, L are modified every time the various parameters of the workpiece to be machined (the ball screw nut 2) are changed. Further, according to the aforementioned description, although the grinding is carried out at one time, the grinding can be carried out at some times until surfaces of the grooves are sufficiently ground. In such a case, the first grinding finishes when the grinding wheel 13 passes through the ball screw nut 2. Then, the second grinding starts by feeding the ball screw nut 2 in an opposite direction to the movement of the ball screw nut 2 in the first grinding by reversely rotating the ball screw nut 2. The offset machining method in the second grinding is similar to that in the first grinding.

If an out-of-circuit ball Bout is erroneously inserted into the out-of-circuit groove Sout of the ball screw nut 2 at the time the thus machined ball screw nut 2 is assembled by loading balls B therein, then the ball screw nut 2 is locked to thereby prevent the screw shaft 1 and the ball screw nut 2 from rotating relative to each other since the passage of the out-of-circuit groove Sout is narrower than the passage of the in-circuit groove Sin. As a result, the presence of the out-of-circuit ball Bout can be detected with ease. Hence, such abnormality as to damage the tongue portions 3a at both ends of the circulation tube 3 as a result of using the ball screw apparatus with the presence of the out-of-circuit ball Bout overlooked.

In addition, it is not necessary to specially make and attach the deflector 5 as in the conventional example, which means that the present invention is advantageous not only in reducing the cost of manufacture in terms of material, the number of assembling steps, and the number of parts, but also in reducing the number of machining steps since the step additionally involved in the present invention is only to partially set the grinding wheel off the centerline and this step is not counted as increasing the number of machining steps.

Although the cases of having two and three in-circuit grooves Sin have been described in the aforementioned embodiment, the present invention can similarly be applied to ball screw nuts having more in-circuit grooves.

Moreover, while the ball screw nut of circulation tube type has been described in the aforementioned embodiment, the present invention is not limited thereto, but can be applied to ball screw nuts of circulation piece type as well.

As described above, the out-of-circuit ball preventing structure for a ball screw nut of the present invention is characterized as making the oblique diameter of the out-of-circuit groove in a ball screw nut having a plurality of ball circulation circuits over the inner circumferential surface thereof smaller than the oblique diameter of the in-circuit grooves. Therefore, the out-of-circuit ball can be completely prevented without using a deflector. As a result of this construction, material, the number of machining steps, the number of assembling steps, and the number of parts can be decreased to reduce the cost of manufacture.

What is claimed is:

1. A ball screw nut adapted to having balls loaded therein, comprising:

a plurality of ball circulation circuits including a first in-circuit groove and a second in-circuit groove for circulating the balls, and an out-of-circuit groove disposed between a first ball circulation circuit and a second ball circulation circuit of said plurality of balls for circulating no balls in an inner circumferential surface of the ball screw nut, wherein the out-of-circuit groove has an oblique diameter that is smaller than that of the first and second in-circuit grooves.

* * * * *